R. C. TOMPKINS,

Assignor to himself and A. SPRING.

HOG SCRAPING MACHINE.

No. 9,799. Reissued July 12, 1881.

Witnesses
John Becker
Jr
Geo K Hayzer

Inventor
R Winslander Tompkins
by his Attorneys
Prout & Brown

N. PETERS, Photo-Lithographer, Washington, D. C.

UNITED STATES PATENT OFFICE.

RHINELANDER C. TOMPKINS, OF NEW YORK, ASSIGNOR TO HIMSELF AND AMASA SPRING, OF WHITE PLAINS, N. Y.

HOG-SCRAPING MACHINE.

SPECIFICATION forming part of Reissued Letters Patent No. 9,799, dated July 12, 1881.

Original No. 196,269, dated October 16, 1877. Application for reissue filed January 9, 1880.

*To all whom it may concern:*

Be it known that I, RHINELANDER C. TOMPKINS, of the city, county, and State of New York, have invented certain new and useful Improvements in Machines for Scraping Animal Carcasses; and I do hereby declare that the following is a full, clear, and exact description of the same, reference being had to the accompanying drawings, forming part of this specification.

This invention relates to machines for scraping animal carcasses, especially hogs, in which scrapers arranged to move in rotation have suitable motion imparted to them by rotary carriers; and it consists in an improved construction, arrangement, and attachment of such scrapers.

One defect in the operation of the machines upon which the present invention is an improvement, and which have long, straight scrapers, was that the scrapers were apt to cut into the flesh of the carcass in scraping when the scrapers came in contact with the prominences of the carcass at the hips and in other portions. I obviate this defect in my present invention by making the entire profile of the scrapers which come in contact with the carcasses arc-shaped. When the aforesaid prominences at the hips and other parts of the carcass are presented to the higher parts of the arc-shaped scrapers, the flexible body of the animal yields and allows the prominences to pass through the hollows between the scrapers in such manner that while the said prominences are thoroughly scraped they are never cut, bruised, or mutilated.

Figure 1:
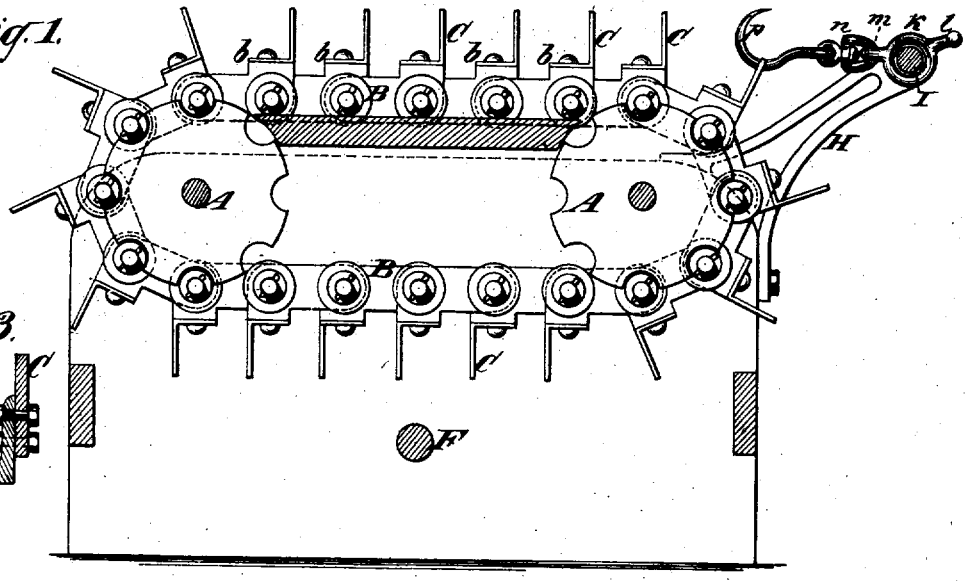
Figure 3:
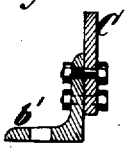
Figure 2:
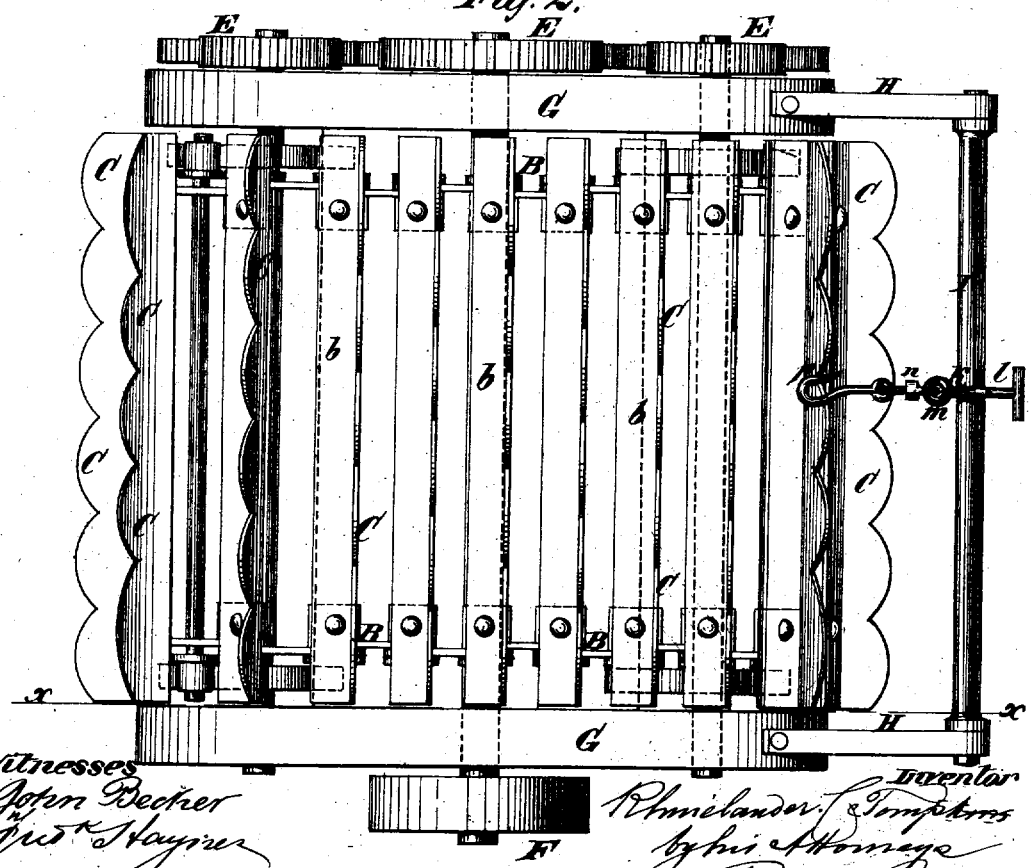

Figure 1 in the accompanying drawings is a vertical section, on the line *x x* in Fig. 2, of a machine comprising my imprvoements. Fig. 2 is a top view of the same. Fig. 3 is an enlarged detail, showing one method of attaching the scraper-blades to the aforesaid base.

A A indicate rotary carriers for carrying the scrapers and causing them to move in rotation. These carriers are represented as consisting of wheels or disks secured to rotary shafts and having notches in their peripheries for the reception of endless chains B, to which the series of scrapers or scraper-blades C C are secured. The said carriers are driven by suitable gearing, E E, from a main driving-shaft, F. The scrapers C C are arc-shaped in the profile of their entire scraping-edges which are likely to come in contact with carcasses, and they may be made of angle-steel, in the same piece with a continuous base, *b*, extending from one endless chain to the other, as shown in Figs. 1 and 2; but they are preferably made separately and attached to a base, *b'*, of angle-iron, as shown in Fig. 3. In either case said base extends at or nearly at right angles with said scrapers, and is long enough to reach from one of the endless chains to the other and attached to both said chains, as shown in Fig. 2. Said bases, with their attached scrapers, are attached to said endless chains in parallel relation, as shown in Fig. 2. Said arc-shaped scrapers C are preferably made of semicircular or approximately semicircular profile, and they are staggered in their position relatively with each other on the chains, as shown in Fig. 2—that is to say, the prominences of the scrapers C in one row, line, or blade are arranged opposite to the hollows or recesses between the scrapers in the preceding row, line, or blade in rotation in the series. Fig. 2 of the drawings shows several arc-shaped scrapers made in one blade, but each curve or distinct arc-shaped section should be considered as one scraper. The edges of the scrapers are formed in other respects in the usual manner of the edges of scrapers.

To opposite sides of the upper portion of the frame G are attached the brackets H. Said brackets support, in parallel relation with the scraper-blades, a rigid bar, I. Upon the bar I is loosely fitted a sliding collar, *k*, preferably having attached to it a handle, *l*. To the said collar is also attached an eye, *m*, to which is connected a swivel, *n*. To the said swivel is connected the hook *p*.

The operation of the machine is as follows: The machine being in motion, the carcass to be scraped, placed on the top of the machine and resting upon the scraper-blades C, is firmly held in due relation therewith by the swiveled hook *p* inserted in the arch of the lower jawbone. The operator then rolls the carcass longitudinally from the side of the machine upon which said carcass was first placed to the other side of the machine, while the several scraper-blades or rows of scrapers act upon it in rotation as they are carried around by the rotary motion of the carriers. After the scraping has been completed the animal is rolled onto a table or bench arranged for its reception. The swiveled hook *p*, attached to the bar I by the sliding collar *k*, is permitted thereby to accommodate itself to the change of position of the carcass so rolled from side to side of the machine, every part of the carcass so treated being thoroughly scraped, except a small portion near the tail, from which the hair has to be removed by hand-scraping.

I claim—

1. In a machine for scraping animal carcasses, a series of scrapers organized to move and operate in rotation, and having their entire edges which operate on the carcasses arc-shaped, substantially as herein described.

2. In a machine for scraping animal carcasses, a series of scrapers organized to move and operate in rotation, having their entire edges which operate on the carcasses arc-shaped, and arranged so that the arc-shaped edges of certain scrapers will be out of line with the arc-shaped edges of preceding scrapers, substantially as herein described.

3. The scraper-blades C, having a curvilinear profile, attached to bases *b*, and staggered in their positions upon the endless chains, substantially as and for the purpose described.

R. C. TOMPKINS.

Witnesses:

FREDK. HAYNES,

E. P. JESSUP.